US012601344B2

(12) United States Patent
Smedley

(10) Patent No.: US 12,601,344 B2
(45) Date of Patent: Apr. 14, 2026

(54) DETECTION AND EXTRACTION OF NAPL CONTAMINATES

(71) Applicant: NAPL Solutions, LLC, Columbia, SC (US)

(72) Inventor: Daniel Alexander Smedley, Baird, TX (US)

(73) Assignee: NAPL Solutions, LLC, Columbia, SC (US)

( * ) Notice: Subject to any disclaimer, the term of this patent is extended or adjusted under 35 U.S.C. 154(b) by 0 days.

(21) Appl. No.: 18/932,343

(22) Filed: Oct. 30, 2024

(65) Prior Publication Data

US 2025/0137451 A1      May 1, 2025

Related U.S. Application Data

(60) Provisional application No. 63/546,366, filed on Oct. 30, 2023.

(51) Int. Cl.
| | |
|---|---|
| *F04B 51/00* | (2006.01) |
| *B09C 1/00* | (2006.01) |
| *B09C 1/02* | (2006.01) |
| *E21B 43/01* | (2006.01) |
| *E21B 47/18* | (2012.01) |
| *F04B 49/06* | (2006.01) |

(52) U.S. Cl.
CPC .............. *F04B 51/00* (2013.01); *F04B 49/06* (2013.01); *B09C 1/002* (2013.01); *B09C 1/02* (2013.01); *B09C 1/025* (2013.01); *E21B 43/0122* (2013.01); *E21B 47/18* (2013.01);

*E21B 2200/09* (2020.05); *E21B 2200/20* (2020.05); *F04B 2203/0201* (2013.01); *F04B 2203/0212* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,273,650 A | * | 6/1981 | Solomon ................. | B09C 1/002 210/104 |
| 5,099,920 A | * | 3/1992 | Warburton ............ | E21B 47/047 166/250.03 |
| 5,173,092 A | * | 12/1992 | Rudder ................... | B09C 1/002 415/203 |
| 5,261,791 A | * | 11/1993 | Goguen ................. | B09C 1/007 210/776 |

(Continued)

*Primary Examiner* — Binh Q Tran
(74) *Attorney, Agent, or Firm* — Haynsworth Sinkler Boyd, P.A.

(57) ABSTRACT

A pump system for selectively extracting nonaqueous phase liquids (NAPLs) from groundwater includes a fuel pump with current monitoring and a control assembly. The system utilizes a conductive probe within a probe body to detect a fluid interface, distinguishing NAPLs from water by measuring conductivity. The control assembly monitors the pump's current draw and adjusts operation to avoid water intake, thereby protecting the pump from damage. The probe body features an insulated shell to ensure accurate readings, and the control assembly uses real-time data to activate or deactivate the pump based on fluid type. The system is further configurable to calibrate for various contaminant conditions, optimizing efficient NAPL extraction from contaminated environments.

20 Claims, 6 Drawing Sheets

(56)     References Cited

U.S. PATENT DOCUMENTS

| 6,146,104 | A | * | 11/2000 | Mastroianni ............ E21B 43/34 |
|---|---|---|---|---|
| | | | | 417/54 |
| 2013/0333881 | A1 | * | 12/2013 | Heller ........................ E03B 3/08 |
| | | | | 166/250.15 |
| 2018/0030978 | A1 | * | 2/2018 | McCarthy ............... F04B 9/113 |
| 2021/0356450 | A1 | * | 11/2021 | Siciliano ............. G01N 33/241 |

* cited by examiner

112

113

115

DETECTION AND EXTRACTION OF NAPL CONTAMINATES

BACKGROUND

Groundwater contamination by nonaqueous phase liquids (NAPLs) is a common issue in the handing, transportation and distribution of petroleum hydrocarbons. These contaminants, often derived from petroleum products (e.g., gasoline, diesel, heating oil, and solvents), are introduced into the environment through various sources, such as oil spills or underground leaks from petroleum storage facilities, releasing the petroleum products and its contaminates into the subsurface. When the petroleum enters the subsurface, it can slowly dissolve or if sufficient fuel is released it can form an NAPL layer that remains atop the groundwater for many years. The persistence the NAPL in the subsurface is extensive, ranging from several years to decades, which has led to the need for extraction technologies. Traditional remedial measures, such as pump-and-treat systems, have struggled to provide for the selective and efficient extraction of NAPLs. These systems frequently extract significant volumes of water along with the NAPLs, which increases treatment costs and can delay the ultimate cleanup of a site. Additionally, current NAPL-only extraction systems are prone to damage when water, rather than NAPL, is drawn into the pump. What is needed is a fuel pump system that can selectively target and extract NAPLs, operate efficiently to minimize water co-extraction, and incorporate safeguards to prevent pump damage due to water intake.

SUMMARY

Figure 1:
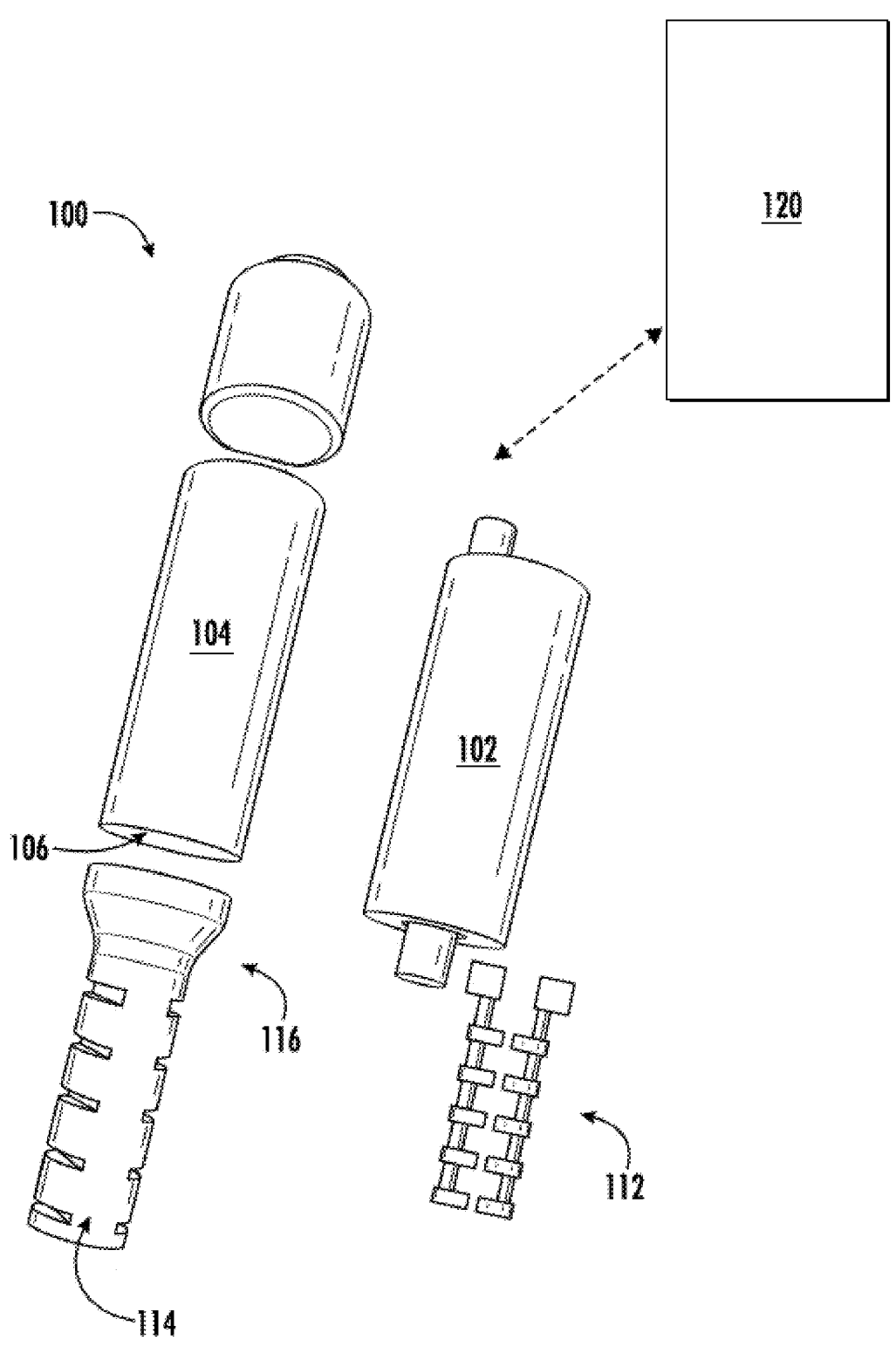
FIG. 1 is a diagram of an example embodiment of the systems and/or methods described herein.

A pump system is disclosed for extracting nonaqueous phase liquids (NAPLs) from contaminated groundwater. The system includes a fuel pump including a motor, a pump housing enclosing the fuel pump, and a conductive probe. The pump housing defines a pump inlet for accepting the flow of an extracted fluid comprising the NAPLs removed from the subsurface environment. The pump housing may define a pump outlet for pumping the extracted fluid.

In some embodiments, the pump system may further include a probe body, a control assembly, and a fuel pump. The probe shell can be an insulated probe shell encasing the conductive probe for ensuring electrical insulation. Additionally, the probe shell can include a fuel inlet for directing the NAPLs into the pump inlet of the pump housing. The control assembly can be in electrical communication with a probe sensor, which may be configured to measure a conductivity condition of the conductive probe. Further, the control assembly may be configured to continuously monitor the conductive probe condition. In some embodiments, the fuel pump is powered by a battery configured to provide power selectively based on a current value of the motor of the fuel pump.

The control assembly may be in electrical communication with the control assembly and further may be configured to continuously monitor an electrical consumption condition of the fuel pump during operation. The control assembly may be configured to determine an average current draw of the fuel pump. In some embodiments, the average current draw may be based on the current draw when the fuel pump is submerged in NAPL. The control assembly can derive a threshold based on the average current draw and further based, in some instances, on a predetermined value associated with the fuel pump. In some embodiments, the operations of the pump system can cease when the detected current value of the motor of the fuel pump exceeds the threshold. The control assembly utilizes real-time data from the conductive probe to determine a position of the fuel pump relative to an interface defined by the NAPLs and the groundwater of the subsurface environment.

Also disclosed is a method of controlling an NAPL extraction pump system for extracting NAPLs from a subsurface environment having a presence of groundwater. The method can include detecting a condition associated with a presence of NAPLs in the groundwater using a sensor of the pump system. The method can also include, in some embodiments, controlling an operation of the fuel pump in response to the condition. Further, the method can include deactivating the fuel pump when the sensor detects an absence of NAPLs. In such embodiments, the sensor can include a conductive probe configured to detect vary levels of conductivity between groundwater and NAPLs. The method may also require calibrating a control assembly of the pump system to distinguish between different types of NAPLs based on their conductivity. In such instances, the control assembly of the pump system can utilize a feedback loop to continuously adjust the pump operation based on real-time data obtained from the sensor of the pump system.

In such embodiments having a control assembly, the control assembly can be integrated with a data logging system to record extraction rates, NAPL concentrations, and the operational status of the pump system. Further, the control assembly can be configured to interface with a remote monitoring system, allowing for adjustments and monitoring.

In some embodiments, the method includes deactivating the fuel pump under certain conditions to prevent damage. For instance, the method can deactivate the pump system upon determining certain conditions associated with conductivity detected by the conductive probe. Alternatively, the method can deactivate the pump system upon determining certain conditions associated with the electrical state associated with the current draw of the fuel pump. It is understood that such methods are not limited to those discussed herein, and the methods disclosed herein may include controlling any other operation of the fuel pump in response to the conditions detected, such as activating the fuel pump in response to the detection of NAPLs.

The systems, methods, technologies, or techniques (the "systems and methods"), described herein, may include a pump system 100 (see FIG. 1) that may be used for selectively pumping nonaqueous phase liquids ("NAPLs") from contaminated groundwater, while avoiding water intake that can damage the pump. The systems and methods may allow the pump system 100 to maintain a desirable position relative to the NAPL/Water interface, thereby protecting the pump system 100 from water damage and ensuring effective NAPL removal.

FIG. 1 depicts an exploded view of the pump system 100. The pump system 100 is configured to extract NAPLs, including light nonaqueous phase liquids (LNAPLs), from contaminated groundwater in an efficient and selective manner. The pump system 100 includes a fuel pump 102 and a pump housing 104 for housing the fuel pump 102. In some embodiments, the fuel pump 102 is equipped with a 12V (Volt) battery configured for selectively providing power to the fuel pump 102 based on the detected current value of the pump motor. The fuel pump 102 defines a pump inlet 106 through which the fuel pump 102 draws NAPLs to be extracted from the subsurface.

The pump system 100 includes a conductive probe 112 and an insulated probe shell 114 encasing the conductive probe 112. Mounted to the fuel pump 102, the conductive probe 112 is configured to detect the presence and level of water in the monitor well. The insulated probe shell 114 is configured for electrically insulating the conductive probe 112 to ensure accurate and precise sensor readings. The insulated probe shell 114 defines a probe inlet 116 (i.e., fuel inlet 116) as the initial entry point for NAPLs to enter into the pump system 100. More particularly, the fuel inlet 116 is oriented to guide NAPLs into the pump inlet 106 located upstream of the fuel inlet. The conductive probe 112 is designed to initiate a response when it comes into contact with water for the pump system 100 to make adjustments as necessary.

The pump system 100 further includes a control assembly 120 in electrical communication with the fuel pump 102 and the conductive probe 112. The control assembly 120 is configured for continuously monitoring data measured by the conductive probe 112. In addition, the control assembly 120 is set to continuously monitor the electrical current consumed by the fuel pump 102. The method of operating the pump system 100 involves a series of steps controlled by the control system 120, which is informed by continuous data monitoring from the control system 120.

When no liquid is present at the pump intake 106, the control system 120 records a DRY FACTOR and establishes a baseline current ("DRY STATE") to calibrate the pump system 100. When the fuel pump 102 is initially lowered and the intake is within the NAPL, the current of the fuel pump 102 motor is monitored to calculate an average current draw ("NAPL AVERAGE"), which is specific to the NAPL being pumped. The control system 120 further determines a calculated multiplier associated with the specifications of the fuel pump 102 of the pump system 100. The calculated multiplier is used with the NAPL AVERAGE to determine an NAPL THRESHOLD. In one embodiment, for example, if the calculated multiplier for the fuel pump 102 is 10%, then the NAPL THRESHOLD can be 10% greater than the NAPL AVERAGE.

The control assembly 120 continuously measures the current draw of the pump motor. If the measured current remains above the DRY STATE and less than the NAPL THRESHOLD, the pump system 100 continues to operate normally. When the monitored current exceeds the NAPL THRESHOLD, it is inferred that water, which is more conductive than NAPL, is entering the pump system 100. At this point, the control system 120 is configured to stop the operation of the fuel pump 102 to prevent water from being extracted and to avoid potential damage to the motor of the pump 102 caused by the higher conductivity of the water.

In addition, the control system 120 utilizes real-time data from the conductive probe 112, to determine the pump's position relative to the NAPL/Water interface, ensuring the selective extraction of NAPL and avoiding water intake. The control system 120 is further configured to make real-time adjustments to the operation or position of the pump system 100 as needed.

DETAILED DESCRIPTION

The present invention relates generally to the field of environmental remediation and, more specifically, to an intelligent pump system for the selective extraction of nonaqueous phase liquids (NAPLs) from contaminated groundwater without incurring damage from water intake. The following detailed description provides a clear understanding of the inventive concept and its operation.

In accordance with an embodiment of the present invention, there is provided a pump system, designated herein as pump system 100. As depicted in FIG. 1, this system is configured to extract NAPLs from subsurface environments. In some embodiments, the pump system may be configured for the extraction of light nonaqueous phase liquids (LNAPLs), from contaminated groundwater sources in a reliable and self-sufficient manner. For instance, the pump system 100 may be configured to protect a fuel pump 102 of the pump system 100 from potential water intake damages while ensuring the effective removal of NAPLs.

Figure 2:
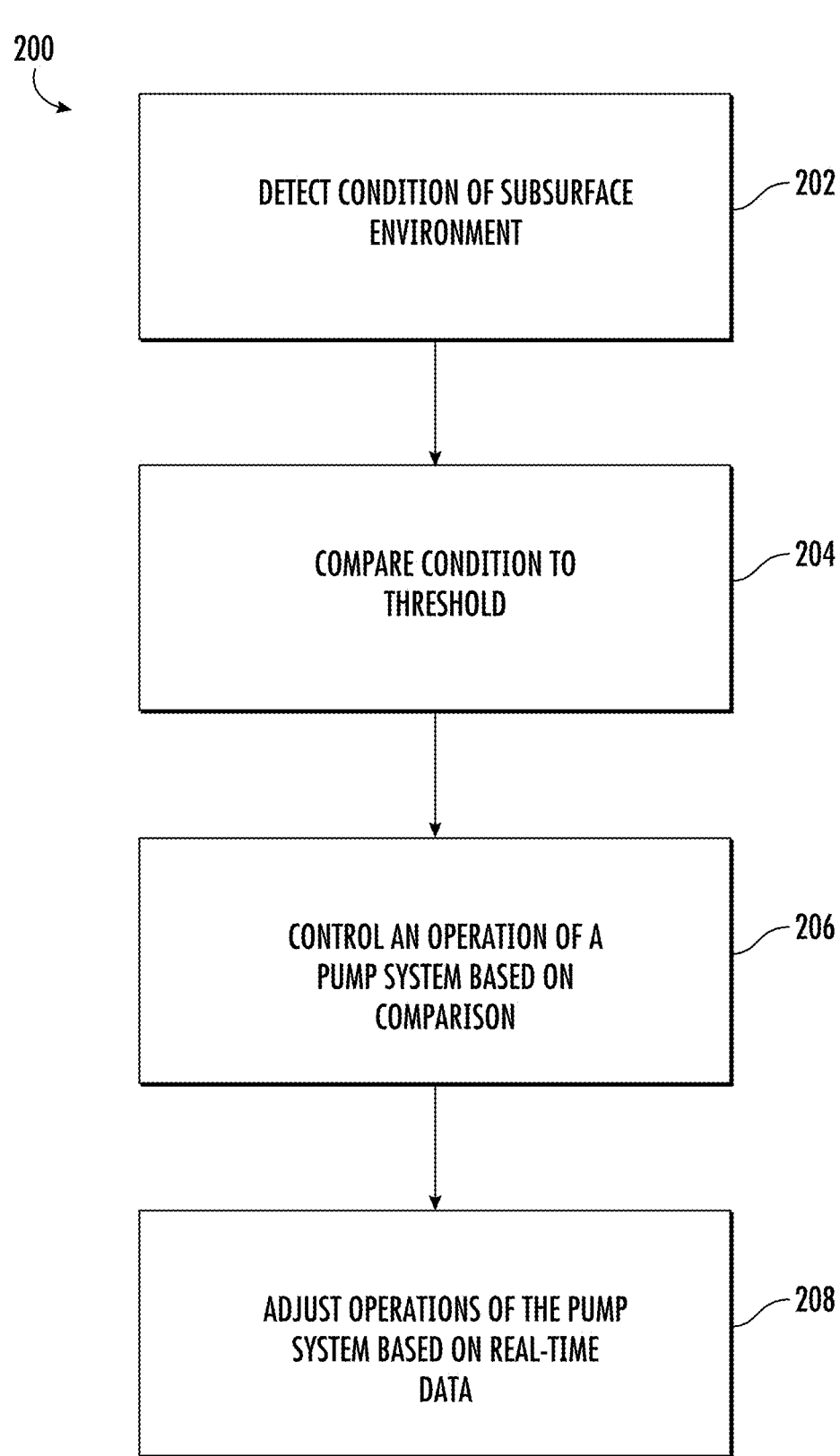
FIG. 2 is a depiction of a flowchart of the systems and/or methods described herein.

FIG. 1 depicts an exploded view of the pump system 100. As shown, the pump system 100 includes the fuel pump 102 and a pump housing 104. The fuel pump 102, which is shown adjacent to the pump housing 104 in the exploded view of FIG. 2, is ordinarily disposed within the pump housing 104. The pump housing 104 may be configured to protect the fuel pump 102 contained therein from the subsurface environment. The fuel pump 102, situated within the pump housing 104, may, in certain embodiments, be powered through a battery. The fuel pump 102 has a current draw during operation of the fuel pump 102, when power is being provided. This battery is adept at selectively providing power based on a detected current value of the fuel pump's motor. A pump inlet 106 of the fuel pump 102 is configured to provide a channel through which NAPLs are actively drawn from the subsurface.

To bolster the efficiency of the system and ensure selective extraction, the pump system 100 incorporates a sensor mechanism. The sensor may include the conductive probe 112, which is coupled to the fuel pump 102. The conductive probe 112 may be firmly affixed to the fuel pump 102 by fasteners or other adhesive agents. The conductive probe 112 is configured to detect the presence and levels of water in the extracted fluid, thereby providing a condition associated with the pump system 100, such as any potential water ingress at undesirable levels. Encasing the conductive probe 112 is a probe shell 114, such as an insulated probe shell, which ensures the probe's electrical insulation, allowing for accurate and consistent sensor readings. The insulated probe shell 114 defines a fuel inlet 116 for directing NAPLs into the pump inlet 106, facilitating the extraction and/or pumping process of the extracted fluid comprising NAPLs.

Further, as shown in FIG. 1, the pump system includes a control assembly 120. The control and monitoring mechanism of the system may be operated via the control assembly 120. The control assembly 120, which is in electrical communication with both the fuel pump 102 and the conductive probe 112, obtains data associated with operation of the pump system 100. For example, the control assembly 120 may monitor the current draw of the fuel pump 102 and the outputs from the conductive probe 112 to provide real-time information regarding the extraction process, which may allow a user to determine where the fuel pump 100 is operating (in a dry state, primarily in water, in an NAPL region) and/or calibrate the pump system 100 as described herein. The control assembly 120 is configured to monitor data continually, collecting real-time data, provided by the conductive probe 112.

Concurrently, the control assembly 120 monitors the electrical consumption of the fuel pump 102 (the current draw of the fuel pump 102) via any one of known techniques for monitoring current draw (e.g., current monitoring system, resistors, transformers, coils). The combination of data from both these systems ensures that the pump system 100 operates under desirable conditions.

The control assembly 120 is configured to operate or make adjustments to the pump system 100. For example, in the absence of any liquid, the control system 120 registers a DRY FACTOR based on the electrical consumption of the fuel pump, establishing a DRY STATE to calibrate the pump system 100. The DRY FACTOR may be synonymous with a first current draw of the fuel pump 102 corresponding to when the fuel pump is operating in a dry state. As the fuel pump 102 becomes submerged within the NAPL region, the fuel pump 102 has a second current draw that is different than the first current draw. The control system 102 monitors the second current draw corresponding to when the fuel pump 120 is submerged within the NAPL region, calculating an average current draw, denoted as the "NAPL AVERAGE." Utilizing this average and certain inherent specifications of the fuel pump 102, the control system 120 derives a threshold value, termed herein as NAPL THRESHOLD.

The state of operation of the pump system 100 or fuel pump 102 is determined, at least in part, on the NAPL THRESHOLD. If the monitored current remains above the DRY STATE but does not exceed the NAPL THRESHOLD, the system operates and pumps the extracted fluid comprising NAPLs. However, exceeding this threshold is indicative of water intrusion, prompting the control system 120 to cease operations to protect the system. The control system 120 may be configured to cut off power supply to the fuel pump 102 intermittently in regular or irregular intervals. Alternatively, the control system 120 may cease operations of the pump system 120 (by cutting off power supply to the fuel pump 102) for a predetermined time, commencing operation of the fuel pump 102 after such predetermined time expires.

Additionally, the control system 120 in electrical communication with the conductive probe 112. The control system 120 relies on real-time data from the conductive probe 112 to continuously assess the pump's relative position concerning the NAPL/Water interface. For example, the control assembly 120 is configured to calibrate the pump system 100 based on the conductivity conditions measured by the conductive probe 112 when submerged in a fluid. The conductive probe 112 is configured to detect a conductivity condition of the adjacent fluid (e.g., NAPL, water). The adjacent fluid may comprise a first fluid associated with a first conductivity condition (a first value) measured by the conductive probe. A second fluid, for example, may be associated with a second conductivity condition (a second value) measured by the conductive probe, where the first value and second value are different. In this way, the control assembly 120 is configured to calibrate the pump system 100 based on the conductivity conditions measured by the conductive probe 112 when submerged in more than one type of fluid.

The control assembly 120 is configured to assess the position of the probe inlet 116 relative to the fluid interface based on real-time data associated with the conductive probe 112, as further described herein. The control assembly 120 is configured to convey information indicative of an adjustment to the position of the probe inlet 116. For example, the control assembly 120 may be in electrical communication with a control assembly (e.g., a remote monitoring system), which is configured to adjust the position of the pump system 102, via a reel line connected to the pump system 102, to place the probe inlet in the fluid containing NAPLs. Alternatively, the control assembly 120 may be configured to convey information to an operator, such information conveying instruction on the adjustments required for the proper extraction of NAPLs.

The pump system 100 detailed in this invention offers a sophisticated, efficient, and reliable means for extracting NAPLs from contaminated groundwater sources. Through its innovative design and integrated systems, it ensures not only effective extraction but also longevity and safety of the pump equipment.

Turning now to FIG. 2, depicted is a method 200 representing an embodiment of the methods disclosed herein. Reference will be made to the embodiment of FIG. 1 for illustrative purposes. One skilled in the art understands that the method represented by FIG. 2 can be performed by alternative pump systems.

The method 200 of FIG. 2 can be for controlling an NAPL extraction pump system, such as the pump system 100 of FIG, for extracting NAPLs from a subsurface environment having a presence of groundwater. The subsurface environment can include the subsurface areas proximate locations where petroleum products have seeped into the ground, causing the presence of NAPLs to persist in or coexist with the groundwater. As shown in 202, the method 200 includes detecting a condition associated with the presence of NAPLs in the groundwater using a sensor of the pump system 100. The condition detected may include one or more of conductivity of an extracted fluid, extraction rates, NAPL concentrations, and operational status over time. The sensor of the pump system may include a conductive probe 112, as shown in FIG. 1. The conductive probe 112 can be configured to detect varying levels of conductivity between water and NAPLs.

As shown in 204, the method 200 includes comparing the condition to a threshold. The threshold may be a predetermining threshold based on the specification of the fuel pump 100. In some embodiments, the threshold is a conductivity of the extracted fluid, as discussed with reference to FIG. 1.

As shown in 206, the method 200 includes controlling an operation of the pump system 100 based on the comparison. For example, the operation of the pump system 100 can be controlled by activating a fuel pump 102 (FIG. 1) in response to the detection of NAPLs above based at least in part on the conductivity detected by the conductive probe 112. In other embodiments, the operation of the pump system 100 can be controlled to deactivate the fuel pump 102 when the sensor (e.g., conductive probe 112) detects an absence of NAPLs or a predominance of water.

As shown in FIG. 2, the method 200 further includes adjusting an operation of the pump system based on real-time data. In some embodiments, a control assembly of the pump system 100, such as the control assembly 120 of FIG. 1, utilizes a feedback loop to continuously adjust the pump operation based on real-time data from the conductive probe 112. The control assembly may be calibrated to distinguish between different types of NAPLs or the concentration of the presence of NAPLs based on the conditions detected by the conductive probe 112. Further, the control assembly 120 may interface with a remote monitoring system to allow for adjustments and monitoring.

Figure 3:
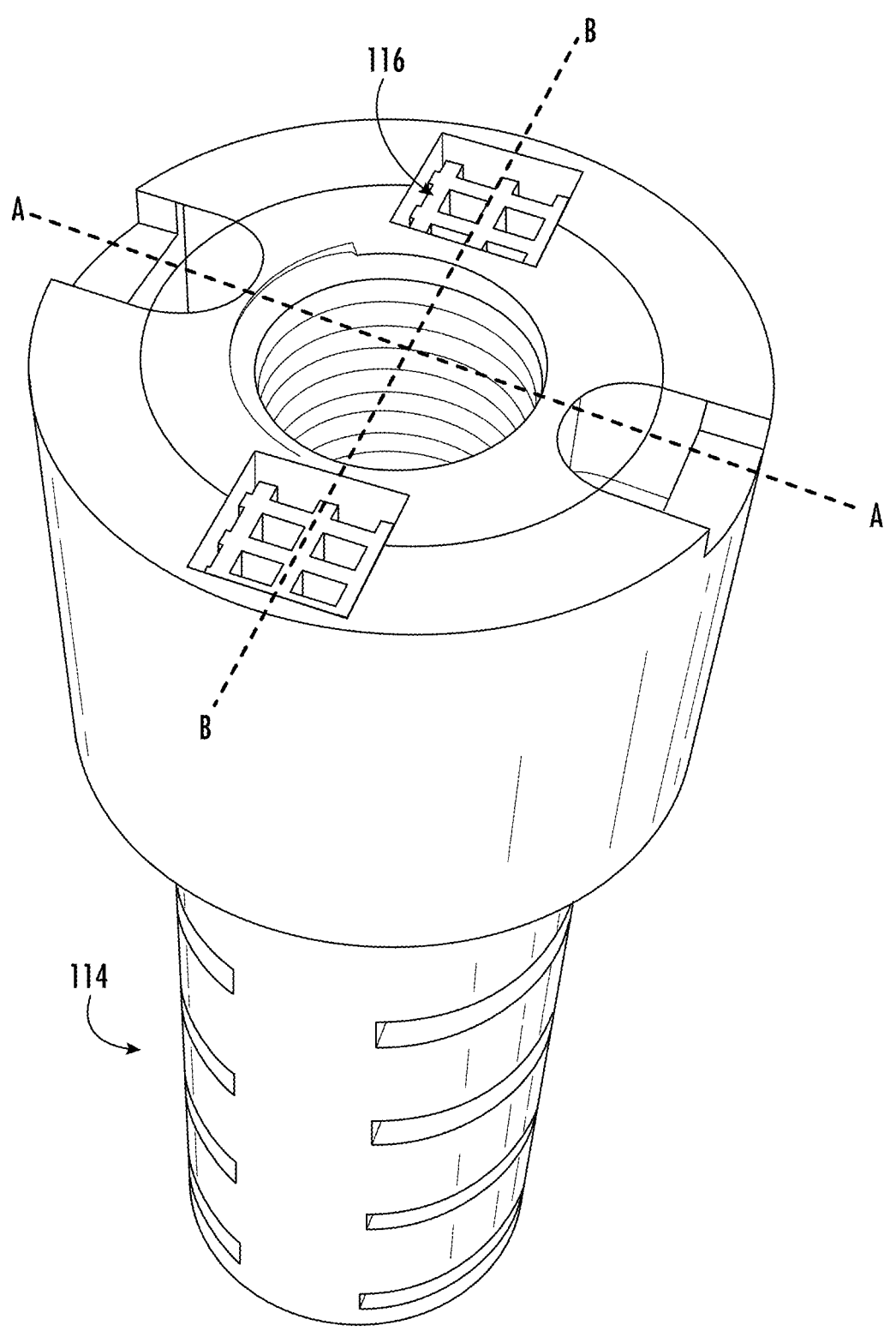
FIG. 3 is a diagram of a portion of a sensor of the pump system described in accordance with example embodiments.

Turning now to FIG. 3, shown is a view of the probe shell 114 depicted in FIG. 1. As shown, the probe shell 114 may be formed as two cylindrical bodies including a perforated body and an intake body. More specifically, the intake body may include fuel intakes 116 disposed opposite each other on the top face of the upper intake body. The perforated body may be configured to encase the conductive probe 112.

Figure 4:
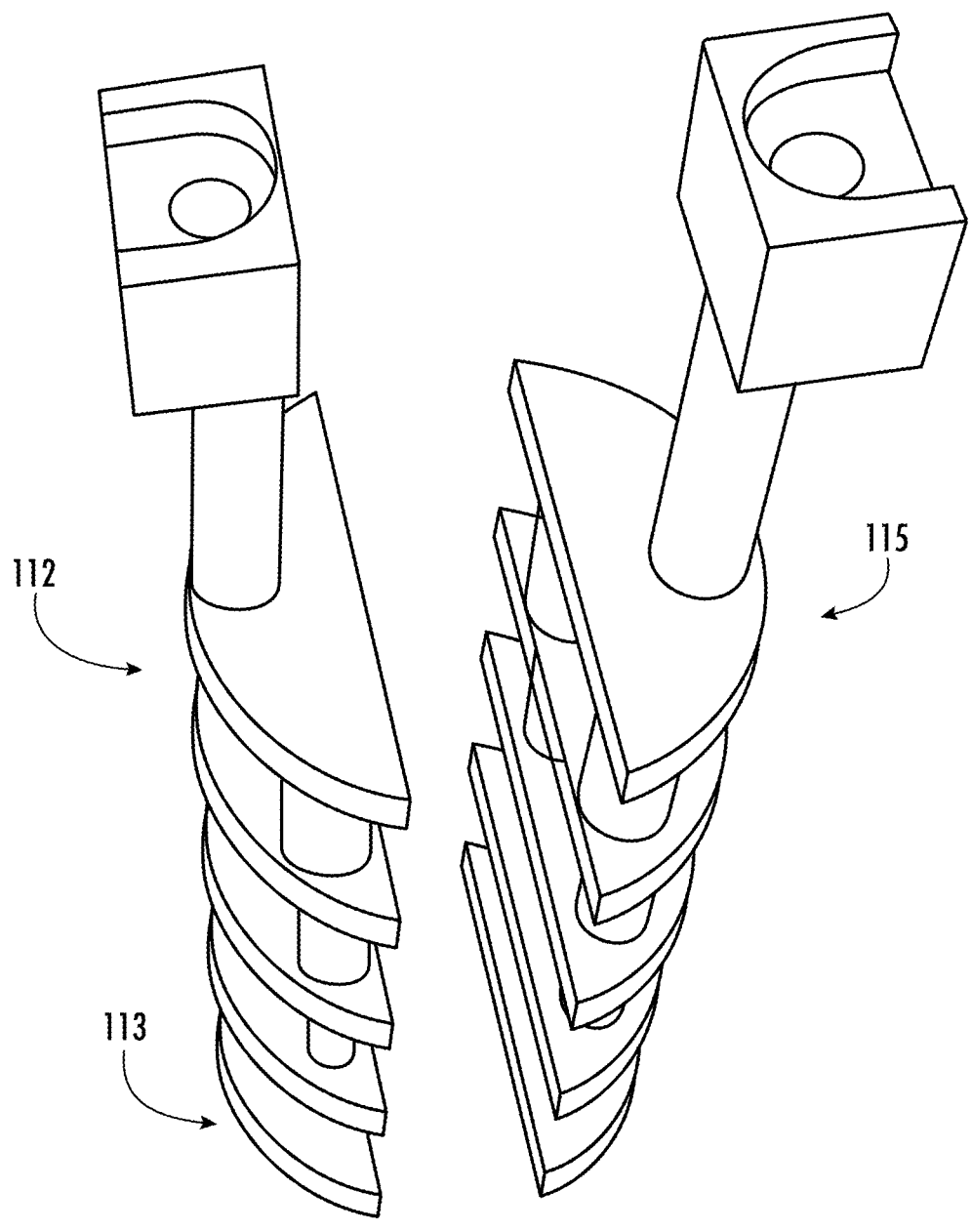
FIG. 4 is a diagram of a portion of a sensor of the pump system described in accordance with example embodiments.

Turning to FIG. 4, a view of the conductive probe 112 is depicted. The conductive probe 112 has a first end 113 and a second end 115. The conductive probe is configured to detect conductivity along the length extending between the first end 113 and the second end 115. The conductive probe 112 is configured to provide a conductivity condition based on the conductivity measured by the probe 112, and further based upon the location between the first end 113 and the second end 115 at which the conductivity is measured.

Figure 5:
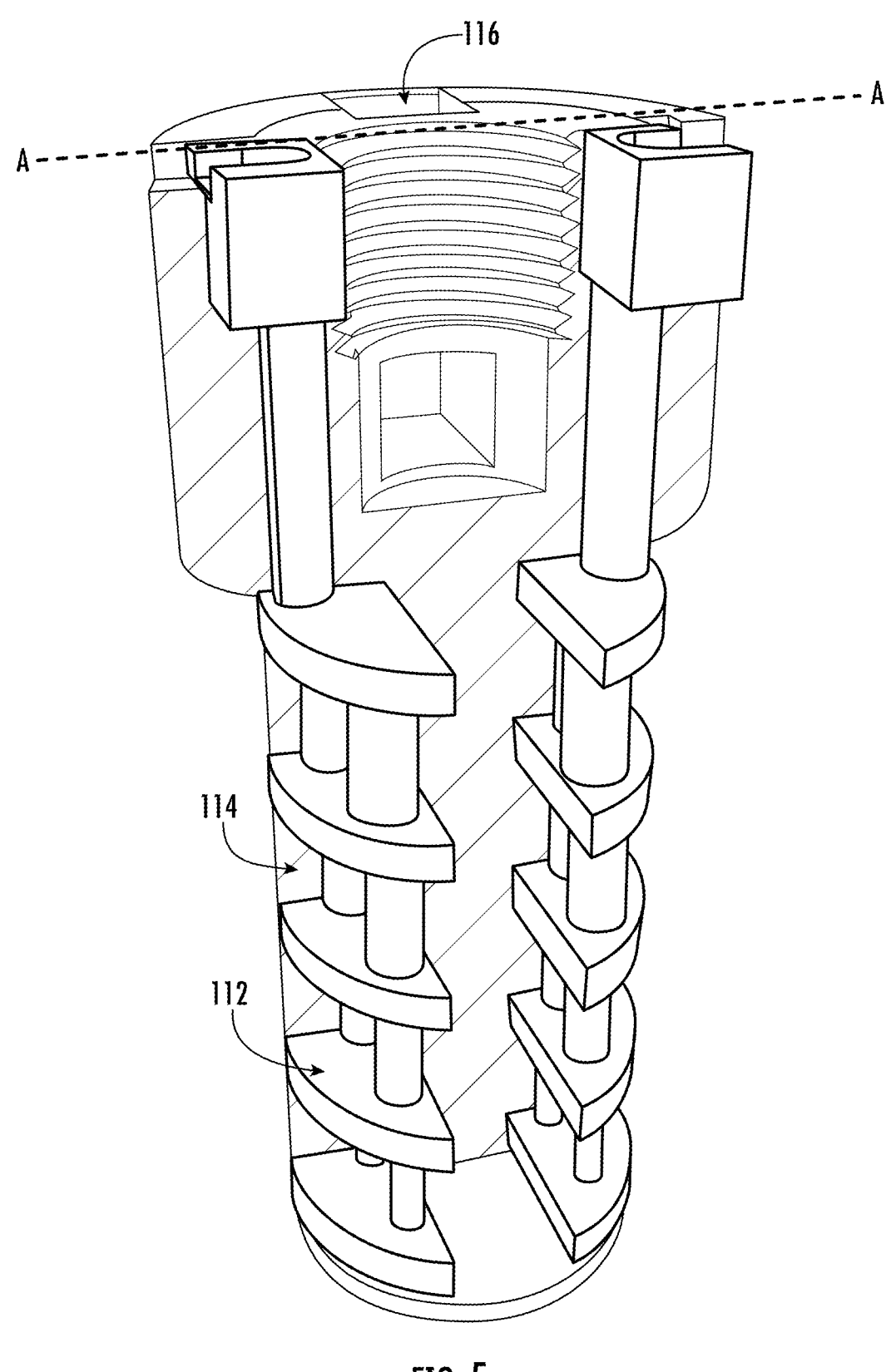
FIG. 5 is a diagram of a cross-section view of the sensor depicted in FIGS. 3 and 4.
Figure 6:
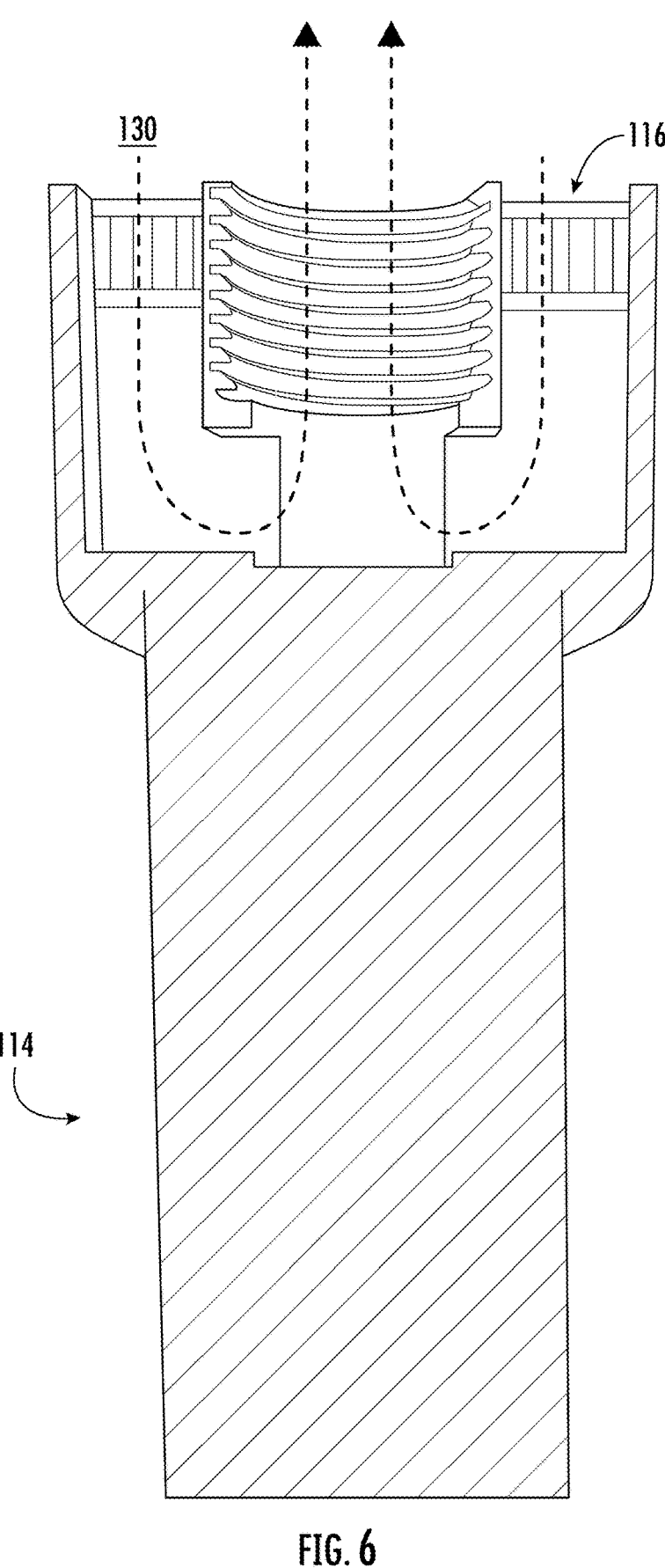
FIG. 6 is a diagram of a cross-section view of the sensor depicted in FIGS. 3 and 4.

Turning to FIGS. 5 and 6, two cross-section views of the conductive probe 112 and the probe shell 114 are shown. FIG. 5 depicts the cross section shown along the A-A cross section line shown in FIG. 3. The conductive probe 112 is encased by the probe shell 114. Semi-cylindrical portions are shown as fitting within the perforated body of the probe shell. As shown in FIG. 6, a cross section along the B-B line of FIG. 3 is depicted. The fuel inlets 116 are shown in FIG. 6. Further flow lines 130 are depicted. The flow lines represent the intake of extracted fluid from the subsurface environment. Specifically, extracted fluid is pumped through the fuel inlets 116 and through the central opening 118, which allows the extracted fluid to flow to the fuel pump 102 to be extracted to the surface.

The foregoing description provides illustration and description, but is not intended to be exhaustive or to limit the implementations to the precise form disclosed. Modifications and variations are possible in light of the above teachings or may be acquired from practice of the embodiments.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Further, certain portions, described above, may be implemented as a component or logic that performs one or more functions. A component or logic, as used herein, may include hardware, such as a processor, an ASIC, or a FPGA, or a combination of hardware and software (e.g., a processor executing software).

It should be emphasized that the terms comprises and comprising, when used in this specification, are taken to specify the presence of stated features, integers, steps or components but do not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A pump system for selectively extracting a contaminated fluid from a subsurface environment, the pump system comprising:
   a fuel pump having a current draw during operation, wherein operation of the fuel pump controls a flow of the contaminated fluid extracted from the subsurface environment;
   a probe body comprising a probe inlet in fluid communication with the subsurface environment and a pump connector in fluid communication with the pump inlet;
   a conductive probe housed within the probe body for detecting a position of the probe inlet relative to a fluid interface of the contaminated fluid; and
   a control assembly configured to control a pumping status of the fuel pump based, at least in part, on the current draw of the fuel pump during operation or on the position of the probe inlet relative to the fluid interface of the contaminated fluid, the control assembly being configured to monitor the current draw of the fuel pump when submerged in the contaminated fluid to establish an operational threshold.

2. The pump system of claim 1, wherein the conductive probe is configured to measure a conductivity condition of the contaminated fluid proximate the probe body to determine the position of the probe inlet relative to the fluid interface of the contaminated fluid and water in the subsurface environment.

3. The pump system of claim 2, wherein the fluid interface is defined by a separation between the contaminated fluid and a second fluid immiscible with the contaminated fluid, the control assembly configured to detect the presence of the second fluid in the subsurface environment and to deactivate the fuel pump when the second fluid is detected at the probe inlet.

4. The pump system of claim 2, wherein the contaminated fluid comprises a nonaqueous phase liquid and the second fluid comprises groundwater.

5. The pump system of claim 1, wherein the control assembly is configured to assess the position of the probe inlet related to the fluid interface based on real-time data associated with the conductive probe, wherein the control assembly is configured to convey information indicative of an adjustment to the position of the probe inlet.

6. The pump system of claim 1, wherein the probe body comprises an insulated probe shell to insulate the conductive probe within the probe body to prevent electrical interference from the subsurface environment.

7. The pump system of claim 6, wherein the probe body includes a perforated section adjacent to the probe inlet, allowing for unimpeded fluid contact with the conductive probe while maintaining insulation.

8. The pump system of claim 1, wherein the control assembly is configured to calibrate the pump system based on the conductivity conditions measured by the conductive probe when submerged in a fluid.

9. The pump system of claim 1, wherein the conductive probe comprises a progressive resistance probe.

10. The pump system of claim 1, wherein the control system is configured to establish a first current draw of the fuel pump corresponding to when the fuel pump is operating in a dry state and a second current draw corresponding to when the fuel pump is submerged in the contaminated fluid.

11. The pump system of claim 1, wherein the control assembly is configured to cease operation of the fuel pump when the current draw exceeds a predetermined threshold associated with water intake.

12. The pump system of claim 1, wherein the control assembly calculates an average current draw of the fuel pump when submerged in the contaminated fluid and establishes the operational threshold based on the average current draw.

13. The pump system of claim 12, wherein the operational threshold is a percentage above the average current draw specific to the contaminated fluid, the operational threshold allowing the control assembly to identify groundwater intake when the current draw exceeds the operational threshold.

14. A method for selectively extracting a contaminated fluid from a subsurface environment using a pump system, the method comprising:

detecting, via a conductive probe, the position of a probe inlet relative to a fluid interface between the contaminated fluid and groundwater in the subsurface environment;

monitoring, via a current monitoring system, a current draw of a fuel pump during operation of the pump system;

activating the fuel pump to extract the contaminated fluid when the probe inlet is submerged in the contaminated fluid;

comparing the current draw of the fuel pump during operation to a baseline current draw and an operational threshold; and controlling the pumping status of the fuel pump based, at least in part, on the current draw and the position of the probe inlet relative to the fluid interface.

15. The method of claim 14, further comprising establishing the baseline current draw of the fuel pump when in a dry state to allow for comparison with the current draw when the fuel pump is in the contaminated fluid.

16. The method of claim 14, further comprising calculating an average current draw of the fuel pump when the probe inlet is in the contaminated fluid and using the average current draw to establish the operational threshold for the fuel pump.

17. The method of claim 16, wherein the operational threshold is a predetermined percentage above the average current draw, and the method includes deactivating the fuel pump when the current draw exceeds this threshold to prevent groundwater intake.

18. The method of claim 14, further comprising continuously adjusting the pumping status of the fuel pump in real time based on current draw data from the current monitoring system, allowing the fuel pump to operate only when the probe inlet is positioned in the contaminated fluid.

19. The method of claim 14, further comprising logging, via the control assembly, operational data over time comprising at least one of current draw, pumping status, and the position of the probe inlet.

20. A pump system for selectively extracting a contaminated fluid from a subsurface environment, the pump system comprising:

a fuel pump comprising a current monitoring system configured to continuously monitor a current draw of the fuel pump during operation, wherein operation of the fuel pump controls a flow of the contaminated fluid extracted from the subsurface environment;

a probe body comprising a probe inlet in fluid communication with the subsurface environment and a pump connector in fluid communication with a pump inlet of the fuel pump;

a conductive probe housed within the probe body, the conductive probe configured to measure a conductivity condition associated with the contaminated fluid proximate to the probe inlet to determine a position of the probe inlet relative to a fluid interface between the contaminated fluid and a second fluid immiscible with the contaminated fluid; and a control assembly in communication with the current monitoring system and the conductive probe, the control assembly configured to:

control a pumping status of the fuel pump based, at least in part, on the monitored current draw and the position of the probe inlet relative to the fluid interface;

deactivate the fuel pump when the conductivity condition detected by the conductive probe indicates the presence of the second fluid at the probe inlet; and calibrate the conductive probe to detect a plurality of conductivity conditions associated with different fluids in the subsurface environment;

wherein the probe body further comprises an insulated probe shell encasing the conductive probe to prevent electrical interference from the surrounding environment, and a perforated section adjacent to the probe inlet to allow unimpeded fluid contact with the conductive probe.

* * * * *